United States Patent [19]

Thomas et al.

[11] Patent Number: 4,938,332
[45] Date of Patent: Jul. 3, 1990

[54] HYDRAULICALLY ACTUATED CLUTCH RELEASE MECHANISM

[75] Inventors: John J. Thomas, Pontiac; Phillip D. Yee, Troy; Daniel F. Kiblawi, Rochester Hills; Bryce W. Babcock, Saline, all of Mich.

[73] Assignee: Federal-Mogul Corporation, Southfield, Mich.

[21] Appl. No.: 238,650

[22] Filed: Aug. 30, 1988

[51] Int. Cl.⁵ .......................................... F16D 25/062
[52] U.S. Cl. .............................. 192/85 CA; 192/91 A
[58] Field of Search ........................ 192/85 CA, 91 A

[56] References Cited

U.S. PATENT DOCUMENTS

| | | | |
|---|---|---|---|
| 3,912,058 | 10/1975 | Parkins | 192/18 A |
| 4,044,871 | 8/1977 | Kiener | 192/91 A |
| 4,051,937 | 10/1977 | Garrett et al. | 192/88 A |
| 4,069,904 | 1/1978 | Garrett et al. | 192/85 CA |
| 4,328,883 | 5/1982 | Shellhause | 192/85 CA |
| 4,585,107 | 4/1986 | Leigh-Monstevens | 192/85 CA |
| 4,585,109 | 4/1986 | Shirley et al. | 192/85 CA |
| 4,620,625 | 11/1986 | Ladin | 192/85 CA |
| 4,708,228 | 11/1987 | Leigh-Monstevens | 192/85 CA |

FOREIGN PATENT DOCUMENTS 1373479 11/1974 United Kingdom.
2088010 6/1982 United Kingdom.
2121504 12/1983 United Kingdom.

Primary Examiner—Rodney H. Bonck
Assistant Examiner—Nicholas Whitelaw
Attorney, Agent, or Firm—Lawrence J. Shurupoff

[57] ABSTRACT

A clutch release mechanism includes an annular piston arranged to move an anti-friction bearing axially for operating a friction clutch between an engaged position and a disengaged position. The outer diametrical dimension of the anti-friction bearing is less than the internal profile dimension of the annular cylinder, whereby the bearing is movable into the space circumscribed by the cylinder when the piston is in its retracted position.

33 Claims, 2 Drawing Sheets

HYDRAULICALLY ACTUATED CLUTCH RELEASE MECHANISM

BACKGROUND OF THE INVENTION

This invention relates to a clutch release mechanism generally similar to the mechanism shown in U.S. Pat. No. 4,620,625, assigned to the assignee of the subject patent application, the teachings of which are incorporated herein. In the aforesaid patent disclosure a hydraulic piston-cylinder mechanism moves an anti-friction bearing axially, whereby the bearing exerts an axial force on radial fingers forming component parts of a friction clutch; deflective movements of the radial fingers act to disengage one friction disk from another friction disk. The anti-friction bearing effectively transmits axial forces to the radial fingers while the fingers are rotating and/or stationary (in a rotating sense).

The aforesaid patent uses an annular piston-cylinder mechanism in order to achieve a balanced application of force to the anti-friction bearing, i.e. essentially the same magnitude of axial force at all points around the mechanism circumference. The circumferentially balanced force translates into a balanced deflection of the radial fingers and a relatively precise axial movement of the clutch friction disk.

Our invention proposes modifications in the structure shown in the aforesaid patent as will adapt the mechanism to use in a particular environment where installation space is restricted in axial and radial directions.

SUMMARY OF THE INVENTION

Our invention contemplates a clutch release mechanism that includes an annular plastic cylinder (housing) installable in a restricted annular space on an outer wall of a transmission housing. The internal diameter of the cylinder fits around an axially-thickened annular section of the transmission housing that is used to mount a bearing for a drive shaft extending out of the transmission housing. An annular (tubular) piston extends from the annular cylinder to apply an operating force to an anti-friction bearing (that engages the clutch-disengagement fingers).

In order to conserve radial space the cylinder walls are made to be relatively thin, e.g. about one eighth inch wall thickness. The walls are reinforced by the addition of two bands; one of the bands encircles the outer annular side surface of the cylinder, while the other band seats against the inner annular side surface of the cylinder. The respective bands resist outward and inward deformations, respectively, of the relatively thin plastic walls due to hydraulic pressures within the annular cylinder.

To conserve axial space an inwardly stepped carrier is affixed to the exposed end of the piston to support the anti-friction bearing radially inward from the inner profile dimension of the annular cylinder. As the piston retracts into the cylinder the anti-friction bearing moves into the space circumscribed by the annular cylinder. This arrangement contributes to the attainment of a relatively long axial movement of the bearing without an excessively long mechanism length overall.

The rotating member of the bearing is constantly in contact with the finger member of the clutch to avoid sudden acceleration of the bearing member during each actuation. This is accomplished by providing a pre-load spring trained between the annular housing and the bearing carrier. The spring is preferably a coil spring having a conical profile, whereby the coil convolutions partially nest within one another when the spring is in its fully retracted condition. This construction somewhat reduces the minimum length of the spring and thus permits a slightly increased stroke distance for the piston and associated anti-friction bearing, otherwise a standard coil spring would be satisfactory.

The anti-friction bearing is capable of limited radial sliding movements on the carrier to compensate for slight radial misalignment of the bearing axis with that of the clutch. A relatively low cost retention means is used to allow the bearing to slidably align itself, i.e. its axis of rotation with the rotational axis of the clutch-disengagement fingers. Thereafter the retention means will retain the bearing in a radially fixed position on the carrier.

A principal object of our invention is to provide a smoothly operating compact clutch release mechanism having relatively small dimensions, axially and radially, while at the same time having a relatively long stroke length. One embodiment of the invention has an overall retracted length of about one and three quarter inch, a diameter of about three inches, and a stroke distance of about three quarter inch. Other dimensional criteria referred to elsewhere in the specification are those pertaining specifically to this same embodiment.

THE DRAWINGS

FIG. 1 is taken essentially on line 1—1 in FIG. 4.

FIG. 2 is taken while the structure is in an intermediate state of fabrication.

DESCRIPTION OF A PREFERRED EMBODIMENT OF THE INVENTION

Figure 1:
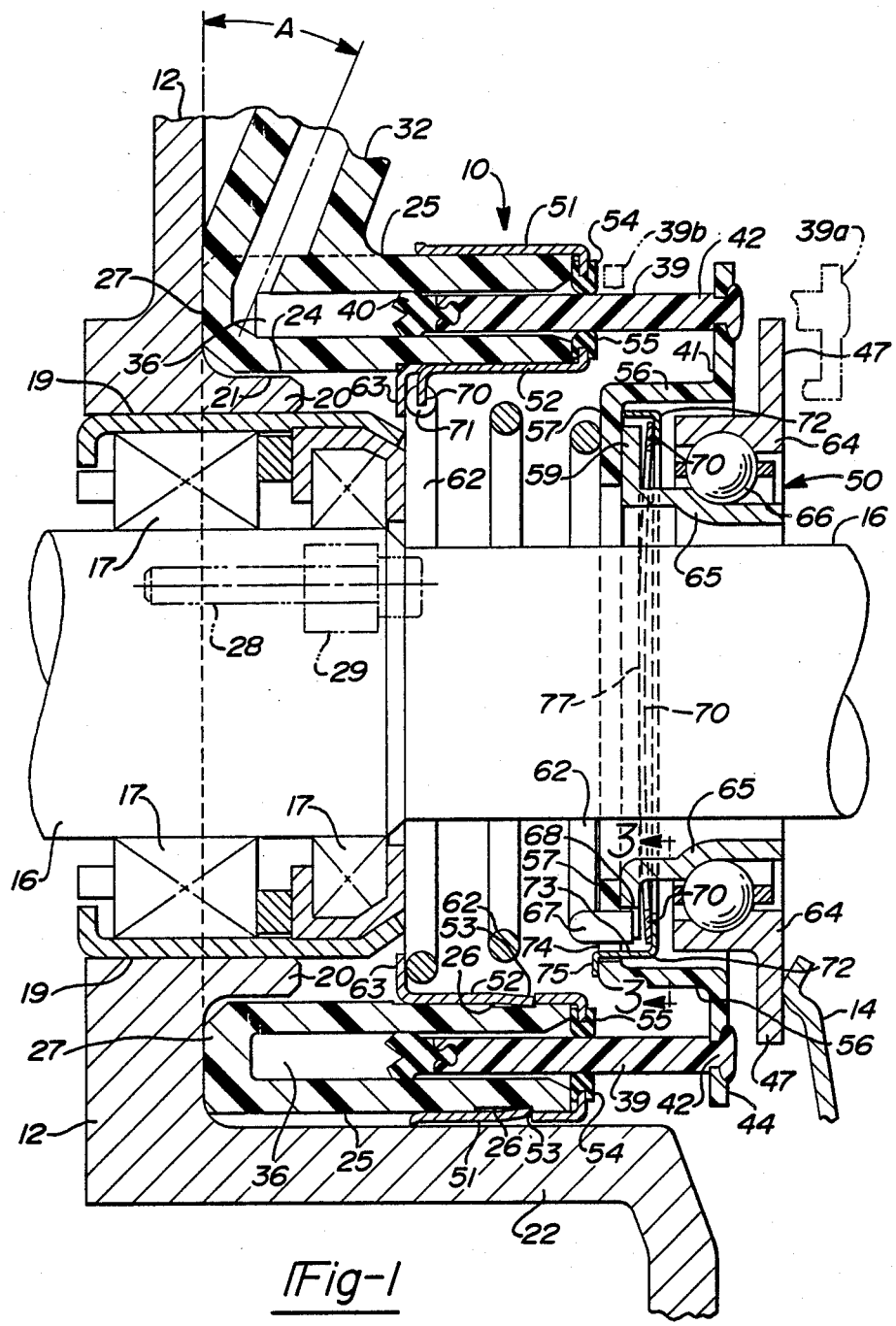
FIG. 1 is a sectional view taken through a clutch release mechanism embodying our invention.
Figure 2:
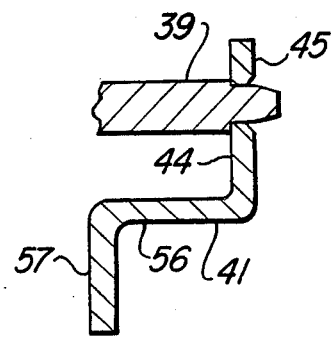
FIG. 2 is a fragmentary sectional view of a structural detail used in the FIG. 1 embodiment.
Figure 3:
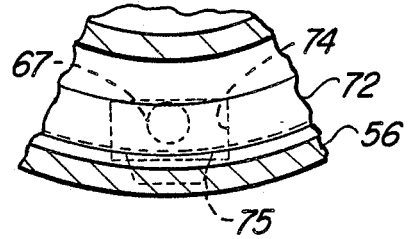
FIG. 3 is fragmentary sectional view of line 3—3 in FIG. 1.

The drawings show a clutch release mechanism 10 mounted on the outer surface of a transmission housing wall 12. In FIG. 1, the transmission components (e.g. shifting elements, gearing, etc.) would be located to the left of wall 12; the friction clutch would be located to the right of mechanism 10. One of the clutch-operating fingers is fragmentarily shown at 14 in FIG. 1. The friction clutch may be constructed as shown generally in U.S. Pat. No. 4,328,883 to R. Shellhause (FIG. 2).

The transmission power input shaft 16 is rotatably supported (at least partially) by bearing structures 17 that are pre-packaged within a metal sleeve 19. The sleeve has a press fit in a through opening defined by an annular axially thickened section 20 of transmission wall 12.

Figure 4:
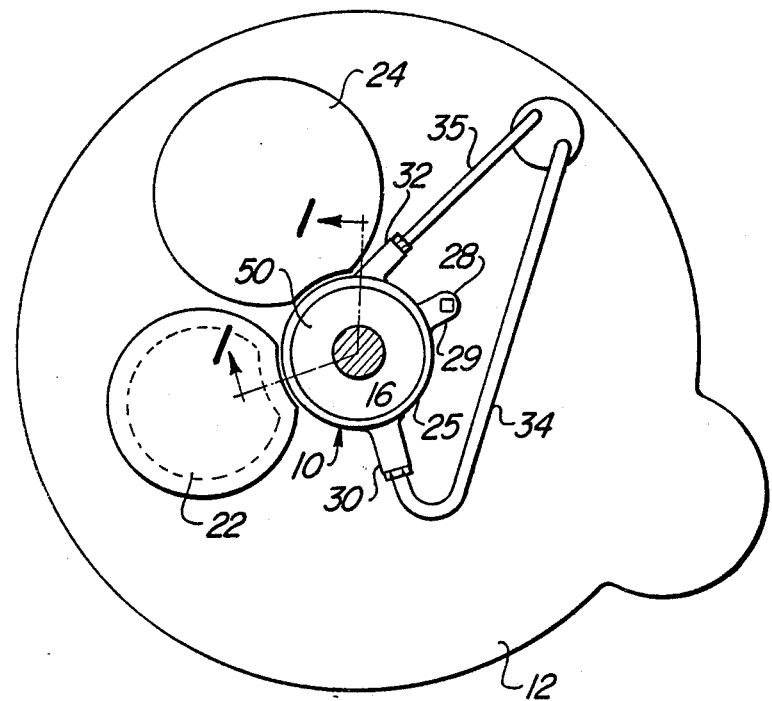
FIG. 4 is right end elevational view of the FIG. 1 mechanism taken on a reduced scale.

The outer surface of transmission wall 12 is interrupted by two protruding wall sections 22 and 24 (seen to be circular in FIG. 4). The protruding wall sections somewhat limit the outer diametrical dimension that clutch release mechanism 10 can have. Axially thickened wall section 20 limits the permissible inner (minimum) diametrical dimension of the clutch release mechanism.

Clutch release mechanism 10 comprises an annular cylindrical housing 25 having a flat annular end face 27 positioned against transmission wall 12. A single integral lug 29 extends outwardly from housing 25 to facilitate attachment of the housing to transmission wall 12. A bolt 28 extends through a bore in lug 29 and into wall 12. The inner annular side surface 24 of housing 25 lies closely adjacent to the outer side surface 21 of annular wall section 20 to generally center the clutch release mechanism 10 on housing 25 relative to the axis of rotation of the clutch. As with the structure shown in U.S. Pat. No. 4,260,625 there is provided a radial clearance between bolt 28 and lug 29, and side surfaces 21 and 24, to allow the clutch mechanism to align itself with the axis of rotation of the clutch.

As seen in FIGS. 1 and 4 the housing includes two integral tubular bosses 30 and 32 that form connections to two rigid metal tubes 34 and 35 that extend along the face of transmission wall 12 (but spaced a slight distance from the wall surface). Tube 34 transmits pressurized hydraulic fluid to and from an annular groove 36 formed in housing 25. Tube 35 constitutes an air bleed line for purging air from the pressurized fluid in groove 36. Each boss 30 or 32 is a hollow tubular construction having a passage that communicates with groove 36 at a point near end face 27 of housing 25.

Each boss 30 or 32 extends at an acute angle A to the surface of wall 12, whereby the outer end of each boss is spaced a slight distance from the wall 12 surface, sufficient for clearance of any connection means and/or installation/disassembly tools associated therewith, e.g. application of a wrench to a coupling nut of the type that is commonly used to connect metal tubing (34 or 35) to a fitting (i.e. boss 30 or 32). Angle A is preferably about twenty degrees. Preferably housing 25, lug 29 and bosses 30 and 32 are integrally formed as component parts of a single unitary plastic body.

Groove 36 extends into housing 25 to a point very near housing end face 27 and the surface of wall 12, to provide a relatively long guide surface for a tubular plastic piston 39. At one end of the piston there is affixed an annular seal 40 of the same construction as shown in FIG. 12 of U.S. Pat. No. 4,620,625 for trapping the pressurized fluid within groove 36. The exposed (right) end of the tubular piston is rigidly connected to an annular carrier 41 via a number of circumferentially-spaced rivets or studs 42 formed integrally with the piston. Each stud 42 extends through a circular hole in carrier wall 44. FIG. 2 shows the stud contour prior to the final step in forming the piston-carrier connection. To make the connection the tip ends of the studs are thermally deformed (with a heated ram element) to cause the stud material to flow radially onto the right face of wall 44 to assume the final configuration (FIG. 1). The hole edge is flared, as at 45, to effectively increase the radius of curvature of the hole edge, thus facilitating plastic flow and the forming of an enlarged plastic head on each stud 42 basically within the width of wall 44. It will be noted each plastic head projects beyond the face of wall 44 only a very slight distance, which minimizes the axial clearance dimension that needs to be maintained between wall 44 and the adjacent flange 47 on anti-friction bearing 50.

Other means of fixing the carrier would also be satisfactory. For example the stud ends could be constructed as bayonet type spring clips which, when inserted through the carrier wall 44, would spring out radially into locking engagement.

Tubular piston 39 and carrier 41 are shown in an intermediate position about midway between the extended position 39a and retracted position 39b of carrier 41. As the piston moves from position 39a to position 39b the carrier walls 56, 57 axially nest within the annular housing 25. During axial movement of the piston, the pressurized liquid in groove 36 exerts deformation (bulging) forces on the thin side walls of housing cylinder 25, especially when the piston is nearing its extended position 39a. To resist distortion of the annular housing the housing is reinforced by two high strength elongated steel bands 51 and 52. Band 51 encircles the outer annular side surface of housing 25, whereas band 52 extends along the inner annular side surface of the housing. Preferably, each band 51, 52 is in line fit or slight interference fit with the respective annular side surface at ambient temperatures, i.e. as assembled. In most instances, an extremely small clearance on the order of 0.0005–0.001 inch can be tolerated provided the relative thermal expansion characteristics between bands 51, 52 and the housing 25, as explained below, provide the required interference fit at normal operating temperatures. Due to the wall reinforcement action of steel bands 51 and 52, the plastic walls of housing 25 can be relatively thin such that the housing can be accommodated in a relatively small clearance space between thickened wall section 20 and protuberance 22.

In operation the hydraulic fluid is at a temperature of about 200° F.–250° F. and at such temperatures the plastic housing will expand into an even tighter interference relationship with the steel bands 51, 52 which in turn assures the increased overall strength characteristics of the thin walled, steel reinforced housing 25 beyond that of the thin walled housing per se. The net result is that the outside diameter of the housing can be decreased from that which would be required of a non-reinforced housing. Other means of reinforcement are also possible within the teachings of our invention. One or more prongs 53 may be bent out of the plane of each band to exert a grip action on the housing surface, thereby preventing inadvertent rightward slippage of the bands off of housing 25, and if desired, the inner and outer diametral surfaces of housing 25 can be provided with a plurality of pockets 26 to receive and provide a stop shoulder for the aforesaid prongs of bands 51, 52. These latter embodiments are particularly useful when there exists only a line fit between either band 51, 52 and the housing.

Preferably each band 51, 52 extends in length to at least halfway along the axial extent of housing 25. However, it would appear unnecessary to require that each band extend the full length of the piston chamber within housing 25.

Each band 51, 52 can serve as a mounting mechanism for an annular elastomeric dust seal 54, 55, respectively. The right end of each band is turned to form a flange to which is bonded an associated seal. The lip surface of each dust seal has wiping engagement with the adjacent side surface of tubular piston 39.

While the preferred band material is steel, other materials of greater strength than plastic housing 25 may be used, at least to provide the strength reinforcing characteristics of the bands.

Annular carrier 41 serves a support function for anti-friction bearing 50. The carrier has a step-like configuration that includes an axial tubular wall section 56, an outwardly-extending annular flange 44, and an inwardly extending annular flange 57, which forms a seat surface for bearing 50. The inner race 65 of bearing 50 includes a radial wall 59 that seats on carrier flange 57, whereby bearing 50 moves axially in synchronism with piston 39 and carrier 41.

Flange 57 is located in an imaginary radial plane between opposite ends of tubular piston 39, e.g. about thirty five percent of the piston length, measured from the piston right end. Wall section 56 is located radially inward from the axial profile of housing 25, such that retractive (leftward) motion of piston 39 causes wall section 56 to move into the space circumscribed by housing 25. The associated bearing 50 enjoys an inward nesting relationship to housing 25, whereby a relatively long axial movement of the bearing can be realized with a relatively short mechanism overall length.

A pre-load coil spring 62 is located between housing 25 and carrier 41 to maintain anti-friction bearing 50 in continuous operative engagement with clutch-engaging fingers 14. The left end face or convolution of coil spring 62 seats against an annular flange 63 extending inwardly from steel band 52; the right end face or convolution of the spring seats against carrier wall 57. Spring 62 has a conical profile as seen in FIG. 1, whereby the coil convolutions partially nest within one another when piston 39 is in its fully retracted position 39b. The spring takes up minimum axial space when the piston is retracted, such that the piston can enjoy a full stroke without interference from the spring.

During system operation the outer race 64 of bearing 50 rotates with fingers 14 about bearing balls 66, whereas inner race 65 of the bearing remains motionless (in a rotational sense). To preclude inadvertent rotary motion of the piston-carrier-bearing subassembly 39, 41, 50 relative to the housing 25, the aforesaid subassembly is anchored by coil spring 62 by providing that the rightmost tip end 67 of the spring be turned axially to extend through an opening 74 in radial flange 57 and into a circular notch 68 in wall 59 of race 65. The leftmost tip end 71 of the spring abuts against a side edge of a tab 70 that is struck out of band 52. Any tendency of the subassembly 39, 41, 50 to rotate causes the rotary force to be applied to tip end 71 of spring 62. The torsional stiffness of the spring is designed to overcome any such rotary force. Thus any such rotational tendency will be precluded by spring abutment tab 70.

Manufacturing tolerances are such that the rotational axis of bearing 50 may not coincide exactly with the rotational axis of the clutch (and shaft 16). In addition to the radial clearance relationship described each in between the transmission housing 12 and the clutch release mechanism 10, the bearing 50 is preferably mounted on carrier 41 so that the bearing can adjust its rotational axis into substantial coincidence with the clutch axis. Thus, wall 59 of the bearing is capable of limited radial sliding motion on the surface of carrier wall 57. An annular wave spring 70 is located between bearing wall 59 and an annular metallic wall structure 72 attached to carrier wall 57.

Wall structure 72 has an L-shaped cross section. At circumferentially-spaced points, preferably six equally spaced points, tabs 73 extend from structure 72 through openings 74 in wall 57. The terminal ends 75 of the tabs are bent right angularly to rigidly lock wall structure 72 to carrier wall 57 and bias wave spring 70 against the opposing walls 59 and 72. Structure 72 forms a rigid annular seat surface for wave spring 70.

Spring 70 may be constructed in different ways. Our preferred construction is a closed loop, four point, wave spring, which will comprise four equally circumferentially spaced wave shaped sections 77 each of which will form a partial bowed section to the left and a partial bowed section to the right. The bowed sections exert oppositely directed forces onto wall structure 72 and bearing wall 59, whereby bearing assembly 50 is yieldably resiliently retained on carrier wall 57.

The mechanism shown in the attached drawings operates essentially in the same fashion as the structures shown in aforementioned U.S. Pat. No. 4,620,625. Thus, in operation, a clutch (not shown) pedal is depressed by the operator actuating a master cylinder (not shown) via a connecting rod assembly. Fluid under pressure is transmitted to the clutch release assembly 10 via the fluid line 34. Piston 39 of the release assembly 10 responds to the fluid pressure and is moved outwardly to position 39a and actuates the clutch via engagement of clutch release bearing 50 with the clutch release fingers 14. When the pedal is released, the spring load of fingers 14 will urge the piston 39 towards its original position 39b whereby the fluid will be returned to the master cylinder through line 34; this in turn will cause the clutch pedal to be returned. In this deactuated condition, the release bearing 39 will be in light engagement with the release fingers 14 at a preload of about 20 pounds through coil spring 62.

While it will be apparent that the preferred embodiments of the invention disclosed are well calculated to fulfill the objects above stated, it will be appreciated that the invention is susceptible to modification, variation and change without departing from the proper scope or fair meaning of the invention.

We claim:

1. A hydraulically actuated clutch release mechanism comprising an annular housing adapted to be situated concentrically about a transmission input shaft and having an annular piston-reception groove extending axially from one end face of said annular housing, a tubular piston extending into said groove for axial movement in response to hydraulic pressure forces generated within the groove, an annular carrier, means for attaching annular carrier to an exposed end of said tubular piston and generally concentric therewith, said carrier extending inwardly from the piston to define an annular seat surface located radially inward of the annular housing, and an annular anti-friction bearing adapted to be situated concentrically about said transmission input shaft, said bearing having an inner and outer race, and one such race being supported on said seat surface for conjoint axial movement of said bearing with said carrier and piston, said annular seat surface being located in a radial plane located between two imaginary radial planes defined by opposite axial end portion of the annular piston, said carrier comprising a first radial wall attached to the piston, a second radial wall located radially inward of the annular housing, and an annular axial wall interconnecting the two radial walls, said anti-friction bearing being located radially within said annular axial wall of said carrier and being located axially substantially between said first and second radial walls of said carrier whereby both said carrier and said anti-friction bearing are substantially radially nested within said annular housing when said piston is in a fully retracted position relative to said housing, said annular housing comprising a rigid plastic material, a steel band encircling an outer annular surface of the annular housing to resist outward radial deformation of the housing wall due to said hydraulic pressure forces, a second steel band in close adjacency to an inner annular surface of the housing to resist inward radial deformation of the annular housing, and each said steel band extending axially from said one end face of the housing to a point along the length of the housing.

2. The mechanism of claim 1 wherein said attaching means comprises a plurality of circumferentially spaced studs formed integrally with the tubular piston, and a similar number of circumferentially spaced holes formed in the carrier, each stud extending through one of the holes and including means fixing said stud to said carrier, said tubular piston being formed of a rigid plastic material, each stud extending axially from the end surface of the tubular piston, and the tip end of each stud being thermally deformed to lock the stud to the carrier.

3. The mechanism of claim 2 further comprising bearing-retention means for retaining the anti-friction bearing on said annular seat surface while permitting said bearing to shift radially relative to the housing, said anti-friction bearing including a flat radial flange slidably positioned on said annular seat surface, and said bearing-retention means including an annular wall structure attached to the carrier in axially spaced relation to the annular seat surface, and a wave spring trained between said annular wall structure and said flat radial flange of the anti-friction bearing.

4. The mechanism of claim 1 further comprising an annular coil spring located between said annular housing and the anti-friction bearing to apply a pre-load force to the bearing, said coil spring being located substantially entirely within the space circumscribed by said annular housing.

5. A compact hydraulically actuated clutch release mechanism comprising an annular housing adapted to be situated concentrically about a transmission input shaft and having an annular piston-reception groove extending axially therein, a tubular piston extending into said groove for axial movement in response to hydraulic pressure forces generated within the groove, an annular carrier, means for attaching said annular carrier to an exposed end of said tubular piston, said carrier extending radially inwardly from the piston to define an annular seat surface located radially inward of the annular housing to accommodate axial nesting of said carrier within said annular housing at a position radially inwardly of said piston reception groove, and an annular anti-friction bearing adapted to be situated concentrically about said transmission input shaft, said bearing having an inner race and an outer race, and one of said races being supported on said seat surface for conjoint axial movement of said bearing with said carrier and piston.

6. The mechanism of claim 5 wherein said annular seat surface is located in a radial plane located between two imaginary radial planes defined by axial end portions of the annular piston.

7. The mechanism of claim 6 wherein said carrier comprises a first radial wall attached to the piston, a second radial wall located radially inward from the annular housing, and an annular axial wall interconnecting the two radial walls.

8. The mechanism of claim 6 further comprising bearing-retention means for retaining the anti-friction bearing on said annular seat surface while permitting said bearing to shift radially relative to the housing.

9. The mechanism of claim 8 wherein the bearing-retention means comprises a wave spring.

10. The mechanism of claim 8 wherein the anti-friction bearing comprises a flat radial flange slidably positioned on the annular seat surface, said bearing-retention means comprising an annular wall structure attached to the carrier in axially spaced relation to the annular seat surface, and a wave spring trained between said annular wall structure and radial flange.

11. The mechanism of claim 5 further comprising an annular coil spring trained between said annular housing and the anti-friction bearing to apply a pre-load force to the bearing, said coil spring being located substantially entirely within the space circumscribed by said annular housing so as not to add to the axial dimension of the mechanism.

12. The mechanism of claim 11 wherein the coil spring is conical, whereby the spring convolutions partially nest within one another when the spring is contracted.

13. The mechanism of claim 11 wherein the ends of the coil spring are anchored respectively to the annular housing and to one race of the anti-friction bearing, whereby said spring acts as an anti-rotation device for said one race.

14. The mechanism of claim 5 wherein said annular housing is formed of a rigid plastic material, and a band of high tensile strength material encircling the outer annular side surface of the annular housing to resist outward radial deformation of the housing wall due to said hydraulic pressure forces.

15. The mechanism of claim 14 wherein the high strength band is steel.

16. The mechanism of claim 14 wherein the high strength band extends axially from said one end face of the housing to a point at least about halfway along the housing axial length.

17. The mechanism of claim 14 further comprising an annular dust seal attached to one end of the high strength band for engagement with the outer side surface of the tubular piston.

18. The mechanism of claim 14 further comprising a second band of high strength material in close adjacency to the inner annular side surface of the housing to resist inward radial deformation of the housing wall.

19. The mechanism of claim 18 wherein the second high strength band is steel.

20. The mechanism of claim 19 further comprising a first radial flange extending outwardly from said second band at the end thereof in close proximity to said one end face of the annular housing, and an annular elastomeric dust seal mounted to said radial flange for engagement with the inner side surface of the tubular piston.

21. The mechanism of claim 20 further comprising a second radial flange extending inwardly from the other end of said second band to serve as a spring seat.

22. The mechanism of claim 5 wherein said attaching means comprises a plurality of circumferentially spaced studs formed integrally with the tubular piston, and a similar number of circumferentially spaced holes formed in the carrier, each stud extending through one of the holes and including means fixing said stud to said carrier.

23. The mechanism of claim 22 wherein said tubular piston is formed of a rigid plastic material, each stud extending axially from the end surface of the tubular piston, and the tip end of each study being thermally deformed to lock the stud to the carrier.

24. The mechanism of claim 23 wherein each hole in the carrier has a flared mouth in the carrier surface facing away from the tubular piston.

25. In association with a transmission having a radial wall having an axially thickened annular section defining a clearance opening therethrough, a drive shaft extending through said opening, and annular bearing means mounted in said thickened wall section for rotatably supporting the shaft,
   a clutch release mechanism that includes an annular housing having first end face seated directly on said radial wall in close surrounding relationship to the axially thickened section, an annular piston-reception groove extending axially into the housing from a second end face of the housing, said groove terminating in close proximity to the first end face, a tubular boss projecting radially outwardly from said housing at a point near the first-mentioned end face and constituting a liquid pressure supply port for said piston-reception groove, said tubular boss extending at an acute angle to the first end face of the housing whereby an outer end portion of said boss is spaced from the transmission wall, and a single attachment lug extending radially outwardly from said housing for fixing said clutch release mechanism to said transmission wall, and a single attachment lug extending radially outwardly from said housing for fixing said clutch release mechanism to said radial wall.

26. The improvement of claim 25 wherein the acute angle is approximately twenty degrees.

27. The improvement of claim 25 wherein the annular housing and associated boss are component parts of an integral one piece plastic member.

28. The improvement of claim 25 further comprising a tubular piston extending into said annular groove, an annular carrier attached to the exposed end of said tubular piston, said carrier being of stepped cross-section to define an annular seat surface located radially inward of the annular housing, and an annular anti-friction bearing supported on the carrier seat surface.

29. The improvement of claim 28 further comprising an annular coil spring trained between the annular housing and the annular carrier to apply a pre-load force to the anti-friction bearing, said coil spring being located substantially entirely within the space circumscribed by the annular housing, said coil spring having a conical profile, whereby the spring convolutions partially nest within one another when the spring is contracted.

30. The improvement of claim 29 further comprising a band of high tensile strength material located adjacent an outer annular side surface of the annular housing to resist outward radial deformation of the housing wall.

31. The improvement of claim 30 further comprising a second band of high strength material in close adjacency to the inner annular side surface of the housing to resist inward radial deformation of the housing wall.

32. The improvement of claim 31 wherein the tubular piston is a rigid thermoplastic material, said piston having a plurality of integral axial studs projecting therefrom, said carrier having through holes fitted onto said studs, the tips of said studs being thermally deformed to cover the exposed face of the carrier, thereby rigidly attaching the carrier to the piston.

33. A compact hydraulically actuated clutch release mechanism comprising an annular housing adapted to be situated concentrically about a transmission input shaft and having an annular piston-reception groove extending axially therein, a tubular piston extending into said groove for axial movement in response to hydraulic pressure forces generated within the groove, exposed end of said tubular piston, said carrier extending radially inwardly from the piston to define an annular seat surface located radially inward of the annular housing, and an annular anti-friction bearing adapted to be situated concentrically about said transmission input shaft, said bearing having an inner race and an outer race, and one such race being supported on said seat surface for conjoint axial movement of said bearing with said carrier and piston, said bearing being axially movable through a region located radially inwardly of said piston-reception groove.

* * * * *

UNITED STATES PATENT AND TRADEMARK OFFICE
CERTIFICATE OF CORRECTION

PATENT NO. : 4,938,332

DATED : July 3, 1990

INVENTOR(S) : John J. Thomas, Phillip D. Yee, Daniel F. Kiblawi and Bryce W. Babcock It is certified that error appears in the above-identified patent and that said Letters Patent is hereby corrected as shown below:

Column 6, line 53, "portion" should read -- portions --.

Column 9, line 6, "study" should read -- stud --.

Column 9, line 33, delete "transmission wall, and a single attachment lug extending radially outwardly from said housing for fixing said clutch release mechanism to said".

Column 10, line 34, after "groove" insert thereat -- an annular carrier, means for attaching said annular carrier to an --.

Signed and Sealed this

Second Day of June, 1992

*Attest:*

DOUGLAS B. COMER

*Attesting Officer*     *Acting Commissioner of Patents and Trademarks*